United States Patent [19]

Rasmussen

[11] Patent Number: 4,799,296
[45] Date of Patent: Jan. 24, 1989

[54] CONNECTOR FOR RELEASABLE SECUREMENT TO THE FREE END OF A LIFTING STRAP

[76] Inventor: Donald D. Rasmussen, P.O. Box 250, Tualatin, Oreg. 97062

[21] Appl. No.: 139,579

[22] Filed: Dec. 29, 1987

[51] Int. Cl.$^4$ ............................................. A44B 21/00
[52] U.S. Cl. .................. 24/68 R; 24/68 CD; 24/71.2
[58] Field of Search ............... 24/68 R, 68 CD, 68 B, 24/68 C, 68 T, 70 R, 71.2, 71.3, 19, 269; 280/179 R, 180; 410/103

[56] References Cited

U.S. PATENT DOCUMENTS

| | | | |
|---|---|---|---|
| 2,715,008 | 8/1955 | Huber | 410/103 |
| 3,290,010 | 12/1966 | Holmes | 24/269 |
| 4,527,309 | 7/1985 | Kawahara | 410/103 |
| 4,530,135 | 7/1985 | Hsiang | 24/68 R |
| 4,584,741 | 4/1986 | Kawahara et al. | 24/68 R |
| 4,604,773 | 8/1986 | Weber et al. | 24/71.2 |

Primary Examiner—Victor N. Sakran
Attorney, Agent, or Firm—Eugene M. Eckelman

[57] ABSTRACT

A connector body portion has opposite ends and a hollow interior. A cross bar in the housing is arranged to receive a looped end of a strap thereover comprising free and lifting end portions and arranged to pinch the free end portion between it and the lifting end portion by a lift force on the latter. A releasable anchor in the body portion is arranged for insertion in the loop of the looped end of the strap for holding the latter in a secured position on the body portion and for release from the body portion to release the strap.

8 Claims, 1 Drawing Sheet

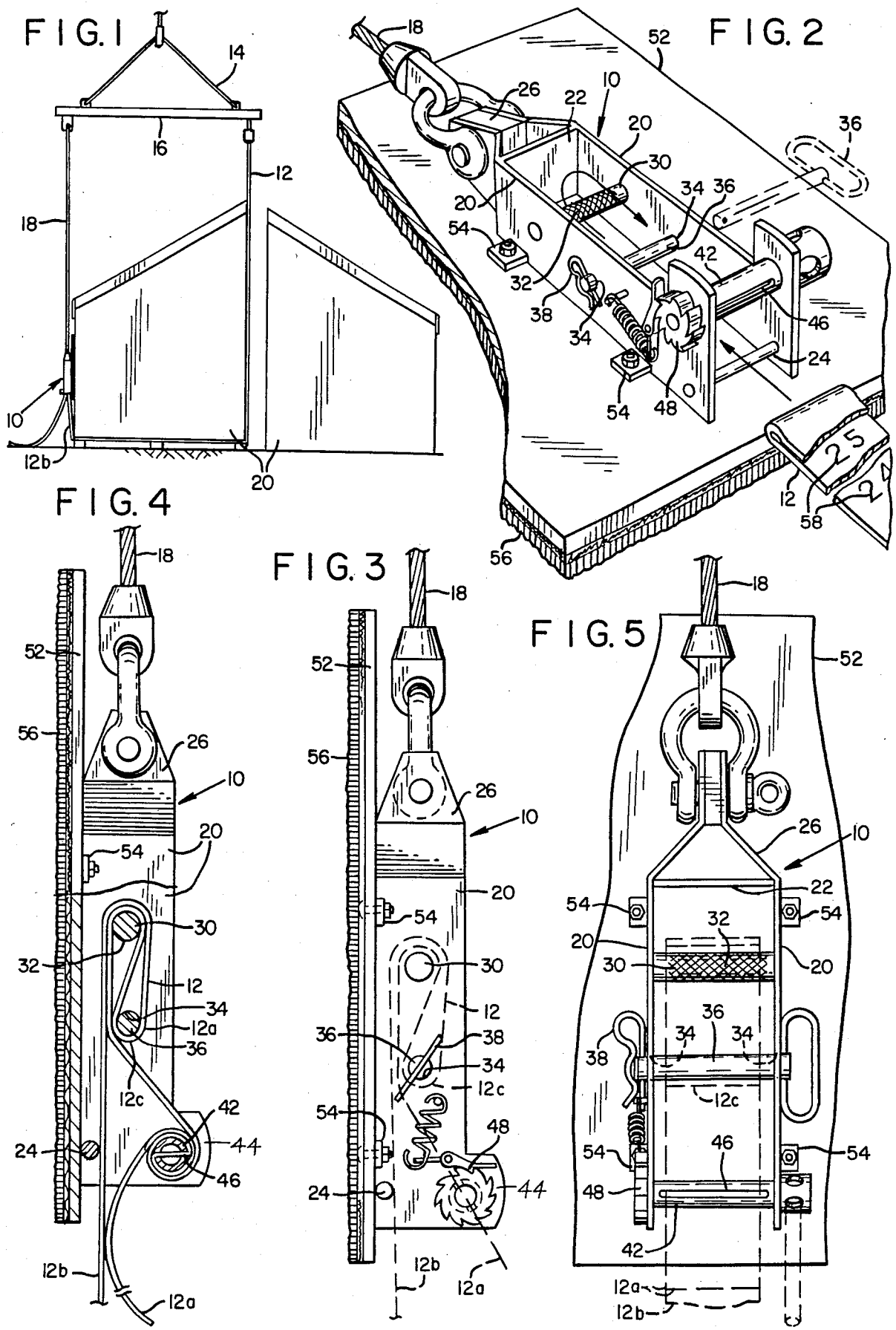

CONNECTOR FOR RELEASABLE SECUREMENT TO THE FREE END OF A LIFTING STRAP

BACKGROUND OF THE INVENTION

This invention relates to new and useful improvements in connectors and is particularly concerned with a strap connector.

Various components, such as modular building sections, are frequently handled by cranes or the like which use cables or straps with heavy and bulky hooks or the like on the ends thereof. Such components must be provided with a rather large space underneath and between them in order to pull out the lifting line and hooks. The components must then be brought together after the lifting lines are removed. Obviously, any material spacing requires considerable extra work in bringing the components into abutment for connection and such comprises a disadvantage of systems that use hooks. Another disadvantage of systems that use hooks or the like, is that they frequently damage the components.

Straps have heretofore been used as lifting lines in view of their versatility, namely, they are easy to handle, they can be manufactured with great tensile strength, and they do minimum damage to components around which they may be engaged. Generally, these straps are provided in specific lengths designed to accommodate specific components to be lifted and have the undesirable opposite end hooks or the like arranged for releasable connection to lifting mechanism.

SUMMARY OF THE INVENTION

A primary objective of the invention is to provide a connector for the releasable securement of one end of a lifting strap thereto whereby the connector allows strapping to be engaged with a component to be lifted and by its structure allows the strap to have a free unobstructed end so that the strap can be pulled free of the component through a minimum space.

Another object of the invention is to provide a connector of the type described which has a simplified structure, which is simple in operation, and which allows a lifting assembly to handle components with substantially one strap length.

In carrying out the objectives of the invention, the connector comprises a body portion having opposite ends and a hollow interior and including stationary anchor means in the body portion arranged to receive a free strap end portion capable of releasable securement thereto. The anchor means is arranged to provide a support on which the free end portion of the strap is pinched under a lifting portion thereof by a lifting force. Releasable pin means are provided in the body portion and arranged for insertion in the loop of the looped end of the strap for positioning the loop in its pinched secured position on the body portion and for release from said body portion when it is desired to disconnect the strap from the connector. The body portion includes ratchet take-up shaft means arranged to take up excess of the free strap end. The stationary anchor means preferably comprises a cross bar having a knurled surface. The length of strap used with the connector may be of maximum length whereby to handle substantially most components, any excess strap merely being unused as a free end.

The invention will be better understood and additional objects and advantages will become apparent from the following description taken in connection with the accompanying drawings.

BRIEF DESCRIPTION OF THE DRAWINGS

FIG. 1 is an elevational view showing a function of the invention, namely, providing a connection for a strap in a lifting for modular building sections;

FIG. 2 is a perspective view of a connector embodying features of the present invention;

FIG. 3 is a side elevational view of the connector;

FIG. 4 is a view similar to FIG. 3 but partly broken away to show structure; and FIG. 5 is a front edge view of the connector.

DETAILED DESCRIPTION OF A PREFERRED EMBODIMENT

With particular reference to the drawings, the numeral 10 designates the body portion of the present connector. This connector is designed for use with conventional strapping 12 arranged to have one end secured to a crane operated lifting assembly 14. The assembly 14 has a spreader 16 to which is secured a lifting cable 18 in turn secured to the present connector 10. FIG. 1 shows as an example the present connector and strap 12 as well as lifting assembly 14 in conjunction with handling building modules 20, wherein these modules are set in place in close relation. It is to be understood, however, that the invention may be used in connection with the handling of other components as well such as containers, vehicles, etc.

Connector 10 comprises a pair of parallel side walls 20 defining an opening at the lower end and integrated into a rugged structure by a top wall or connecting portion 22 and one or more reinforcing cross rods 24. The top wall 22 has an extension 26 for suitable connection to the lifting cable 18.

A heavy duty cross bar 30 is secured between the side walls 20 in an upper part of the body portion but in spaced relation to the top wall 22. This bar is also spaced between the edges of the side walls. The surface 32 of cross bar 30 is knurled for a reason to be described hereinafter. Cross bar 30 also contributes to rugged reinforcement of the walls 20.

Each of side walls 20 has an aperture 34. These apertures are in alignment with each other and arranged to releasably receive a pin 36 capable of being locked in place by a cotter 38. Apertures 34 are spaced from the bar 30 in a direction toward the open or bottom end of the connector and are also spaced between the side edges of the connector.

A strap take-up shaft 42 has journaled support in extensions 44 extending from one edge of the side walls at the bottom end of the connector. Shaft 42 has a diametral slot 46 capable of slidably receiving the strap and has selected controlled rotation by a ratchet mechanism 48 operative on the shaft.

Connector 10 can be integrally attached edgewise to a rigid baseboard 52, as by connecting ears 54 on the side walls 20. The opposite surface 56 of the baseboard from the connector supported surface is cushioned.

In the operation of the present connector for association with a component 20 to be lifted, it is located by means of a crane operated assembly 14 adjacent the component, the cushioned surface 56 of the baseboard 52 facing the component. The free end of the strap is brought down the one side opposite from the connector and under the component. It is then attached to the connector as follows: With the slack in the strap between the spreader 16 and the connector being manually taken out, the free end of the strap, designated by the reference character 12a in FIG. 4 is doubled back on a lifting portion 12b thereof. The doubled back portion is made of a sufficient length such that it can extend over the cross bar 30 with its looped portion, designated by 12c, and at least down as far as the apertures 34. At this time, the pin 36, which has been previously removed, is then inserted in apertures 34 and through the loop 12c. Also at this time or before if desired, the loose or free end 12a is threaded through the slot 46 in the take-up shaft. The unused end of the strap will merely hang free. In the process of pulling the unused end through the slot in the take-up shaft, sufficient slack is left in the strap between the pin 36 and the take-up shaft such that at least two wraps can be taken on the shaft whereby to provide a positive hold of the strap on the shaft. The slack is then taken out of this free span of the strap by rotating the shaft ratchet with control.

The strap is provided with length indicia 58 thereon giving the length of the strap from the connecting point of the strap with the lifting assembly 12. Such can be used as a guide in its engagement with the connector 10, for example, when more than one strap is used, they can be readily attached to the connector 10 at equal lengths.

As the connector is lifted by the crane and a load is thus put on the lifting end 12b of the strap, this portion of the strap bears down on the free end of the strap and pinches it against the cross bar 30, thus providing a positive non-sliding frictional connection for said free end. The wrapping of the free end of the strap on the take-up shaft insures a greater positive securement of the strap to the connector but generally is not necessary for the hold on the strap. Knurled surface 32 of the cross bar 30 provides a good grip on the strap.

When the component that is being handled has been set in place, it is merely necessary to release the free end of the loosened strap from the take-up shaft and to remove the pin 36. Since the free end of the strap does not have any obstruction thereon, it can be readily pulled out from under and up the side of the component. With the present system, components are capable of being set closely together and thus readily removed into abutting relation in a final structuring step. With the use of the present invention, a strap can be of a length to accommodate substantially all components to be handled since any excess strap length is merely taken up in the connector as a free unused end.

It is to be understood that the form of my invention herein shown and described is to be taken as a preferred example of the same and that various changes in the shape, size and arrangement of part may be resorted to without departing from the spirit of my invention, or the scope of the subjoined claims.

Having thus described my invention, I claim:

1. A connector comprising:
   a body portion having opposite ends and a hollow interior,
   stationary anchor means in said body portion arranged to receive a doubled and looped end of a strap thereover comprising free and lifting end portions and arranged to pinch the free end portion between it and the lifting end portion by a lift force on the latter,
   and pin means removably mounted in said body portion arranged for insertion in the loop of the looped end of the strap for holding the latter in a secured position on said body portion with the free end of the strap pinched between said anchor means and the lifting end portion and also arranged for removal from the interior of said body portion to release the strap from the body portion.

2. The connector of claim 1 including winding means on said body portion arranged to take up excess of the free end portion from said releasable anchor means.

3. A connector for releasable securement to the free end portion of a lifting strap having a lifting end portion, said connector comprising:
   a body portion having a pair of spaced side walls defining an open bottom end,
   a connecting top wall portion integral with said side walls,
   means on said top connecting wall portion arranged for connection to a lift line,
   a cross bar extending between said side walls and integral therewith,
   and a pin removably mounted in apertures in said side walls at a point spaced from said cross bar and intermediate said cross bar and said open bottom end of said body portion,
   said pin being arranged for insertion in said apertures and through a loop formed in a strap which has been doubled over from its free end and first laid over said cross bar to position a free end portion of the strap between said cross bar and the lifting end of the strap, whereby the strap is securely connected to said connector until removal of said pin by a lifting force on the lifting end portion of the strap which pinches the free end portion between said cross bar and the lifting end portion.

4. The connector of claim 3 including winding means on said body portion arranged to take up excess of the free end portion from said end.

5. The connector of claim 3 including ratchet take-up shaft means on said body portion arranged to take up excess of the free end portion from said pin.

6. The connector of claim 3 including a knurled surface on said cross bar.

7. In combination:
   a lifting strap having a free end portion and a lifting end portion;
   a connector having a body portion comprising a pair of spaced side walls defining an open bottom end,
   a connecting portion integral with said side walls,
   means on said connecting wall arranged for connection to a lift line,
   a cross bar extending between said side walls and integral therewith,
   and a pin removably mounted in apertures in said side walls at a point spaced from said cross bar and intermediate said cross bar and said open bottom end of said body portion,
   said pin being arranged for insertion in said apertures and through a loop formed in a strap which has been doubled over from its free end and first laid over said cross bar to position a free end portion of the strap between said cross bar and the lifting end of the strap, whereby the strap is securely connected to said connector until removal of said pin by a lifting force on the lifting end portion of the strap which pinches the free end portion between said cross bar and the lifting end portion.

8. The combination of claim 7 including length indicating means on said strap.

* * * * *